(12) United States Patent
Dufresne et al.

(10) Patent No.: US 8,088,705 B2
(45) Date of Patent: Jan. 3, 2012

(54) PROCESS FOR SULFURIZATION OR PRESULFURIZATION OF SOLID PARTICLES OF A CATALYST OR AN ADSORBENT

(75) Inventors: Pierre Dufresne, Valence (FR); Franck Labruyere, Saint Georges les Baines (FR); Maxime Meens, Livron sur Drôme (FR); Loredana Romano, Palermo (FR)

(73) Assignee: IFP Energies Nouvelles, Rueil-Malmaison Cedex (FR)

( * ) Notice: Subject to any disclaimer, the term of this patent is extended or adjusted under 35 U.S.C. 154(b) by 0 days.

(21) Appl. No.: 12/117,805

(22) Filed: May 9, 2008

(65) Prior Publication Data
US 2008/0312076 A1 Dec. 18, 2008

(30) Foreign Application Priority Data
May 10, 2007 (FR) ...................................... 07 03360

(51) Int. Cl.
*F26B 19/00* (2006.01)
(52) U.S. Cl. .............. 502/220; 502/41; 502/44; 502/45; 502/46; 502/47; 502/514
(58) Field of Classification Search .................. 502/202, 502/219, 33, 216, 5, 56, 20, 34; 34/61, 147, 34/164
See application file for complete search history.

(56) References Cited

U.S. PATENT DOCUMENTS

| | | | | |
|---|---|---|---|---|
| 4,094,777 A * | 6/1978 | Sugier et al. | ................ | 210/670 |
| 4,334,982 A * | 6/1982 | Jacquin et al. | ............ | 208/216 R |
| 4,492,748 A * | 1/1985 | Lutz et al. | ...................... | 430/175 |
| 4,719,195 A * | 1/1988 | Toulhoat et al. | .............. | 502/216 |
| 5,508,243 A * | 4/1996 | Mitzkat et al. | .................... | 502/5 |
| 5,592,748 A * | 1/1997 | Mitzkat et al. | ..................... | 34/61 |
| 6,059,956 A * | 5/2000 | Dufresne | ...................... | 208/108 |
| 6,100,216 A * | 8/2000 | Dufresne et al. | .............. | 502/219 |
| 6,265,501 B1 * | 7/2001 | Commereuc et al. | ........... | 526/69 |
| 6,558,531 B2 * | 5/2003 | Steffens et al. | ............... | 208/113 |
| 6,827,908 B1 * | 12/2004 | Chen | ............................ | 422/145 |
| 6,838,487 B1 * | 1/2005 | Demirel et al. | ............... | 518/710 |
| 7,291,311 B2 * | 11/2007 | Sanchez | ........................ | 422/111 |
| 7,368,409 B2 * | 5/2008 | Robinson et al. | ............... | 502/45 |
| 7,582,587 B2 * | 9/2009 | Dufresne et al. | .............. | 502/216 |

FOREIGN PATENT DOCUMENTS

| | | |
|---|---|---|
| EP | 0 612 561 A1 | 8/1994 |
| EP | 0 707 890 A1 | 4/1996 |
| EP | 0 785 022 A1 | 7/1997 |
| FR | 2 760 386 A1 | 9/1998 |

(Continued)

*Primary Examiner* — Melvin Mayes
*Assistant Examiner* — Colette Nguyen
(74) *Attorney, Agent, or Firm* — Millen, White, Zelano, Branigan, P.C.

(57) ABSTRACT

The invention relates to a process for incorporating sulfur in the porosity of the solid particles of a catalyst for the conversion of hydrocarbons or an adsorbent. This process is carried out off-site in the presence of hydrogen sulfide that is pure or diluted in hydrogen or nitrogen, a process in which said particles are made to rise or fall in a sulfur incorporation zone that comprises at least one vibratory helical coil that is essentially tubular in shape and that comprises at least two turns, whereby said particles are subjected to a temperature profile over the majority of their path in said coil and whereby said particles are brought into contact with at least one fluid on at least one portion of their path.

18 Claims, 2 Drawing Sheets

FOREIGN PATENT DOCUMENTS

| | | |
|---|---|---|
| FR | 2 780 315 A1 | 12/1999 |
| FR | 2 780 316 A1 | 12/1999 |
| FR | 2780316 * | 12/1999 |
| FR | 2 788 260 A1 | 7/2000 |

* cited by examiner

PROCESS FOR SULFURIZATION OR PRESULFURIZATION OF SOLID PARTICLES OF A CATALYST OR AN ADSORBENT

OBJECT OF THE INVENTION

This invention relates to a process for off-site sulfurization or presulfurization of particles of a catalyst or an adsorbent in a vibrating rising- or falling-type reactor, which may or may not be heated, in the presence of hydrogen sulfide that is pure or diluted in hydrogen or nitrogen.

The invention also relates to a process for incorporating sulfur in the porosity of the solid particles of a catalyst for converting hydrocarbons or an adsorbent, whereby said process is carried out off-site and in the presence of hydrogen sulfide that is pure or diluted in hydrogen or nitrogen, process in which said particles are made to rise or fall in a sulfur incorporation zone that comprises at least one vibratory helical coil, whereby said particles are subjected to a temperature profile.

Advantageously, the coil is essentially tubular in shape, whereby the tube is essentially vertical and comprises at least two turns, whereby said particles are subjected to a temperature profile over the majority of their path in said coil, and said particles are brought into contact with at least one fluid over at least a portion of their path.

In general, the particles are subjected to an increasing or decreasing temperature profile in the directions of movement of the particles.

Advantageously, at the end of the path, the particles are cooled by a coolant.

In the process according to the invention, the temperature is advantageously between 20 and 500° C., preferably 20 and 250° C.

An advantageous administration of the process is the sulfurization of catalysts or adsorbents that contain at least one or the other of the metals cobalt, molybdenum, nickel and tungsten or the sulfurization of catalysts or adsorbents that contain at least copper, silver or gold.

An advantageous embodiment is the one where the coil is not heated, whereby the exothermicity of the reaction makes it possible to heat the particles substantially.

The device that allows the implementation of the invention advantageously comprises a metal coil that is essentially tubular in shape or a metal coil that is flattened in shape.

FIELD OF THE INVENTION

The invention relates to the sulfurization or presulfurization of a catalyst or an adsorbent with operating conditions that are described in particular in the European Patent of the applicant EP-B-785022 and that provides precious information on the principles of sulfurizations/presulfurizations.

It is often desirable to initiate a sulfurization (in general called "presulfurization") of metals that enter into the composition of certain catalysts for refining and/or hydroconverting hydrocarbons, either when these catalysts are new or at the end of the regeneration of these catalysts before reusing them. Likewise, it is also desirable, in certain fields, also to carry out a sulfurization/presulfurization of certain adsorbents that contain metals.

It will be recalled here, as it is explained in detail in EP-B-785022 cited above, that a presulfurization of new or regenerated catalysts is desirable for the use of these catalysts in refining reactions, for example the reactions of hydrotreatment or hydrodesulfurization or hydrocracking of various petroleum fractions of which it is advisable, before use, to lower the sulfur content or to improve other characteristics. The reactions of reforming, hydrogenation, and dehydrogenation, for which also it is often advantageous to presulfurize the catalyst, will also be cited.

Such reactions (hydrotreatment, in particular) are generally carried out in the presence of hydrogen, between 100 and 400° C., under a pressure of between, for example, 5 and 200 bar, with a volumetric flow rate (expressed in m3 of liquid injected feedstock per m3 of catalyst and per hour) of between 0.1 and 10, whereby these operating conditions are not limiting.

By way of example, a catalyst that is used in the refining reactions can contain a substrate, for example an alumina or alumina mixtures (U.S. Pat. No. 4,334,982) or any other suitable substrate that is based on at least one oxide of a metal or metalloid, whereby this or these substrate mixtures can at least partially come in amorphous form or in crystalline form (zeolite, for example), whereby the catalyst can also contain 0.1 to 30% of at least one active metal of groups IVB, VB, VIB, VIIB, VIIIB, IB, IIB of the periodic table, or other groups of the periodic table.

The metals of the catalysts that are used in refining, hydrorefining or in petrochemistry, whether they are new or regenerated, are most often in oxidized form. However, the metals of these catalysts often being active or high-performing only in sulfurized or at least partially sulfurized form, it is therefore necessary for the refiner or for the petrochemist to run a sulfurization of the catalyst prior to its implementation.

Thus, before being used, the catalyst, new or regenerated, is generally subjected, in the prior art, to a sulfurization or a presulfurization. This sulfurization/presulfurization makes it possible to include in the catalyst, for example, approximately 50 to 110% of the stoichiometric amounts of sulfur calculated based on the amounts of sulfur of formula (according to the metals that are present) $MoS_2$, $WS_2$, $Co_9S_8$ and $Ni_3S_2$.

This sulfurization (presulfurization) is carried out by means of at least one sulfurizing agent. It is possible to use various sulfurizing agents, for example hydrogen sulfide ($H_2S$), preferably in the presence of hydrogen, optionally in the presence of gaseous hydrocarbons (U.S. Pat. No. 4,334,982) or any other product that is able to decompose into $H_2S$, thus, in the presence of hydrogen, carbon sulfide $CS_2$, polysulfides (organic, in particular: the butyl, octyl, nonyl, and dodecyl polysulfides), sulfides or disulfides such as dimethyl sulfide (DMS) and dimethyl disulfide (DMDS), the oxygenated compounds of sulfur, dimethyl sulfoxide, sulfolane, etc. The sulfurization (or presulfurization) can be carried out by temperature steps (European Patent EP-B-64429).

It is noted that in certain methods of sulfurization/presulfurization, the presence of hydrogen is not necessary, at the very least at the beginning of presulfurization. Thus, the European patent of the applicant EP-B-130850 relates to a process that makes it possible to incorporate ex-situ at least one sulfurizing agent with the required stoichiometric or non-stoichiometric levels in the absence of hydrogen in the porosity of the new or regenerated catalyst. Then, at the time of its start-up, the catalyst is subjected onsite ("in situ") to the activation reaction in the presence of hydrogen, which allows the formation of active sulfides for the reaction.

Other types of catalysts or adsorbents that contain transition metals require additions of sulfur before use to impart to them either optimal catalytic properties or optimal adsorption properties.

Thus, in EP-A-466568 or the French Patent Application 05470 of Apr. 3, 2003 that refers to reactions for catalytic reforming or selective hydrogenations of gasolines, it is sometimes suitable to attenuate the activity of the catalysts. Thus, the case of the catalysts that contain nickel that are very active—and even too active—for the hydrogenation of the aromatic compounds will be cited at such a point that they can cause heat runaways during the startups of new or regenerated catalysts that can even proceed until the reactor is damaged. It is therefore necessary to initiate passivation treatments that make it possible to avoid these runaways. The latter generally consist in irreversibly poisoning by sulfur the most virulent active sites of nickel that exist on the new or regenerated catalyst. Thus, more particularly regarding the nickel-based hydrogenation catalysts, the first thing to do, therefore, in a first stage, is to reduce the metal oxide with hydrogen in the reactor ("in situ"), and then, to remedy the drawbacks indicated above, in a second stage, the activity of the catalyst, in situ, is reduced by introducing an amount of sulfur that is in general determined to be 0.1 to 5% by weight of sulfur relative to the catalyst weight.

In the application for catalytic reforming of the gasolines, the catalysts that are based on platinum and rhenium should also be selectively sulfurized to reduce the hydrogenolyzing (cracking) activity of rhenium, which is carried out by a sulfurization that makes it possible to set approximately 0.05 to 0.1% by weight of sulfur.

Regarding the adsorbents, it is possible to refer to, for example, U.S. Pat. No. 4,094,777, which describes a method for eliminating the mercury that is present in the natural gases and/or liquids by adsorption on a solid. It is known that certain metals, in particular gold, silver and copper, form amalgams with mercury, creating a possibility of extracting mercury by adsorbents that contain some of these metals. These adsorbent masses prove very effective if the metals that are used are in the sulfide state.

For the adsorption techniques, the patent EP-A107582 that describes adsorption masses for the elimination of the mercury that is present in a gas or a liquid will be cited, whereby these new masses comprise a substrate and copper in the sulfide state. Likewise, the U.S. Pat. No. 4,902,662 describes a copper-based adsorbent that is sulfurized with an organic polysulfide. U.S. Pat. No. 5,350,728 or U.S. Pat. No. 5,245,106, in which the adsorption mass of mercury also contains copper (in CuO or $Cu_2O$ form) that is sulfurized by incorporation of elementary sulfur, is also cited.

The Concept of the Invention

According to the invention, two essential methods are applied in combination:
(1) "Off-site" (ex-situ) sulfurization/presulfurization.
(2) Use of a "rising-" or "falling-"type sulfurization/presulfurization reactor that is essentially vertical, tubular in shape and vibrating.

The Prior Art Relating to the First Point (Off-Site)

Formerly, the sulfurization/presulfurization was carried out in-situ, i.e., either in the refining reaction zone or in the adsorption zone, where the catalyst or the adsorbent is used, or in the immediate vicinity of the reactor ("in situ" is written arbitrarily), i.e., at the top of the reactors or in zones that are more or less in direct communication with these reactors, requiring performing under operating conditions (of temperature, pressure, etc.) that are imposed at least partially by the operating conditions of the reactors themselves or annexes of these reactors.

The Prior Art Regarding the Second Point

The reaction for sulfurization/presulfurization of particles of a catalyst or an adsorbent was also carried out either in a fixed bed or in zones where the solid catalyst or adsorbent particles are in motion, for example in the form of a compact bed or in the form of a moving bed as it is explained in WO98/06493, or else in the form of a rotating bed of particles in a rotary kiln (see the patent of the applicant FR-B-2649623).

These various implementations are explained below.

The document EP-0612 561 describes the device that comprises a coil as used in the invention, which is heated by Joule effect.

The Invention

This invention therefore relates to a process for off-site sulfurization or presulfurization of particles of a catalyst or an adsorbent in an essentially tubular and vertical vibrating reactor of the rising type or the falling type, heated or not, in the presence of hydrogen sulfide that is pure or diluted in hydrogen or nitrogen as a sulfurizing/presulfurizing agent.

The Invention Regarding the First Point (Off-Site)

In the prior art, such a sulfurization or presulfurization is carried out in-situ or ex-situ (off-site). Currently, the regeneration of catalysts is done increasingly at the site of a specialist in catalyst regeneration, in general far from the industrial plant, therefore off-site. It seems reasonable, however, to think of sulfurizing offsite as well for the purpose of restoring a ready-to-use product to the refiner. This is what made possible the process of the patent of the applicant EP-B-130850, or U.S. Pat. No. 4,530,917 (see also EP-B-181254 or U.S. Pat. No. 4,719,195) in which a sulfide compound of organic polysulfide type is incorporated in the catalytic mass. The catalysts are delivered to the refinery or to any other plant, thus preconditioned to be activated there. The refiner, or any other user, has only to activate this catalyst (for hydrotreatment in particular) in the presence of hydrogen so as to make the sulfur react on the metals that are contained and then to start up the reaction for refining or preserving hydrocarbons by injection of the feedstock to be treated.

In EP-B-707890 of the applicant, the sulfurizing agent is elementary sulfur or $H_2S$ or one of the organic polysulfides that are cited above with treatment with hydrogen and oxidizing passivation, whereby these two stages (treatment with hydrogen and passivation) can be carried out together. In EP-B-785022 of the applicant, the presulfurization above is carried out in a moving bed in the presence of a compound that contains sulfur and hydrogen. According to the techniques of the applicant, the presulfurization of the catalyst is conducted "ex situ."

The first aspect of the invention is that the sulfurization/presulfurization of the catalyst or of the adsorbent is carried out "off-site," i.e., at a site that is separate from the site of use of the catalyst for its operation of conversion or hydroconversion of petroleum feedstocks. This special feature provides many advantages, in particular because the catalyst that is loaded into the unit already contains the necessary amount of sulfur but also that it is already activated furthermore, therefore already ready to be used as an active catalyst. This special feature gains the user of the catalytic unit precious time in the refinery because it considerably simplifies the start-up process.

The off-site sulfurization can also have another type of decisive advantage. In some cases, it can be carried out only off-site, because it would not be possible to carry it out in the reactor that contains the catalyst or the adsorbent. Actually, these sulfurization reactions may require operating conditions, in particular, for example, of temperature, which cannot be produced in the reactors where the catalytic reaction or adsorption reaction is carried out.

Thus, it is possible to note the very particular conditions that are pointed out in the U.S. Pat. No. 5,350,728 that is mentioned above for the elimination of mercury. An adsorbent mass undergoes an incorporation of copper, secondarily silver, then it is calcined. Next, a sulfurization of metals (copper in the form of CuO or $Cu_2O$, silver, . . . ) is initiated using sulfur flour that is diluted or in a suspension in an organic solution, then drying at 150° C. These are the operating conditions that would be difficult to implement in a mercury adsorption reactor.

The Invention Regarding the Second Point (Use of a Vibration Zone)

Another aspect of the invention is that this sulfurization preferably takes place on a catalyst in motion in the sulfur incorporation zone. The activation reactions thus take place while the catalyst is in motion and not in a fixed bed.

Actually, the potential problem of the fixed beds is the existence of preferred paths that have the effect of creating zones where the catalyst will have run up against inadequate amounts of sulfur relative to the necessary stoichiometry. Another potential problem of the fixed beds is also the relative difficulty of evacuating the calories that are formed by the exothermal sulfurization reactions. The continuous mixing of the catalyst is advantageous for these two purposes. Thus, the procedure is performed with a catalytic bed in motion.

In the prior art, it is possible to use, for example, either a sinking type of bed where the solid slowly drops by gravity along a tube or a ring, or a fluidized bed where the solid is raised by a high-speed gas flow, or a moving bed, or else a bed where the catalyst circulates in a belt furnace or in a rotary kiln. The bed optionally can be an expanded bed or a boiling bed.

These catalysts or adsorbents contain metals that can be sulfurized, such as, for example, those of columns IVB, VB, VIB, VIIB, VIIIB, IB, IIB of the periodic table.

Detailed Description of the Reactors in Motion of the Prior Art in the Sulfurization/Presulfurization Processes Thus, in this invention, the process for presulfurization or sulfurization is carried out ex-situ (off-site), whereby this off-site aspect is combined (see below) with the technique of an upward or downward movement of the particles of a catalyst or an adsorbent.

In the prior art, this sulfurization or presulfurization, often formerly carried out in a fixed bed, is carried out instead now in moving beds that are more effective than using a fixed bed as indicated in WO 98/06493. Thus, in this patent WO 98/06493, a fluidized bed-type sulfurization/presulfurization zone is used with an expanded bed that is supported by a grid. The catalyst is introduced into the zone, and a fluidization gas is injected to bring about the expansion of the particle bed of a catalyst.

Another type of moving bed is described in the French Patent FR-A-2649623 that is also used for a sulfurization/presulfurization of catalytic particles. Here, it is a device called a "Louisville" rotary kiln. The catalyst is introduced into this furnace by an endless screw and brought into contact with hot steam tubes that lie low on the inside walls of the ring.

Detailed Description of the Sulfurization/Presulfurization Zones According to the Invention This invention relates to a sulfurization or presulfurization of powdered particles of a catalyst or an adsorbent in a process that consists in said particles either rising or falling in at least one metal vibratory helical coil that is essentially tubular in shape, in subjecting them over a majority of their path to a temperature profile and in bringing them into contact with at least one fluid over at least a portion of their path.

The coil may be essentially tubular in shape or flattened in shape, such as a closed trough or two plates, one on top of the other.

In contrast, the exothermicity of the sulfurization reaction makes it possible to heat the particles substantially. Also, in an advantageous embodiment of the invention, the device according to the invention is not heated. By contrast, it may be more or less heat-insulated by insulating materials so as to disperse the heat that is created by the progression of the reaction. The temperature of the particles is an outcome of the calories that are produced, which themselves depend on flow rates of reactive solids and gas, and calories exchanged toward the outside.

The French Patent FR-A-2780316 describes a device that comprises a vibratory helical coil such that the heat exchanges are produced by indirect contact with a coolant that bathes the turns of the coil or by direct contact with at least one gas that circulates inside the coil concurrent with or in counter-current to the direction of circulation of the solid particles. Here, this invention also makes it possible to carry out, with this type of apparatus, the treatment of catalytic and/or adsorbent solid particles that rise within at least one vibratory helical coil that is essentially tubular in shape, whereby said particles are subjected to a temperature profile (either for heating or for cooling) over a majority of their path and whereby said particles are brought into contact with at least one fluid over at least a portion of their path. Said fluid is preferably a reactive gas in the case of solid particles of a catalyst or an adsorbent. It is also possible, however, to use this type of apparatus by creating there a downward movement of the solid catalyst or adsorbent particles. A vibrating "downward" device is thus presented.

Figure 1:
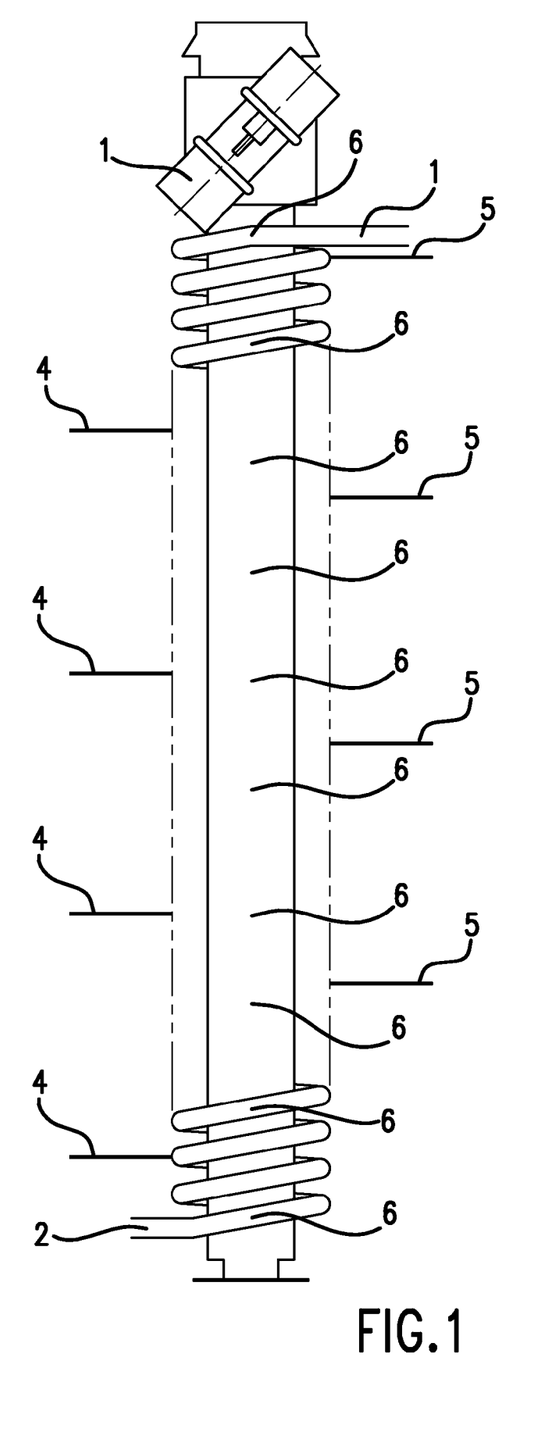
FIG. 1 represents a vibratory coil reactor of the invention.

In the case of an upward movement, a vibratory helical coil with an upward rise of the solid particles of a catalyst or an adsorbent is described in FIG. 1. The coil is wound around a drum, which is brought into vibration by, for example, two unbalanced motors (1). The input of solid particles is carried out at the bottom of the coil by the hose (2) and their discharge takes place at the top via the hose (3). The inputs of reaction gases are made via the hoses (4) and the discharges via the hoses (5). Thermocouples disseminated along the tube make possible a precise monitoring of the temperature of the product (6).

The process according to the invention consists in sending through the catalyst or adsorbent particles into at least one vibratory helical transporter that contains at least one coil, then in subjecting them on at least a portion of their path and preferably on the majority (more than half) of their path to a temperature profile, and in bringing them into contact with at least one fluid (gas that comprises the sulfur-containing compound) on at least a portion of their path. The fluid is introduced at least one point of the vibratory helical transporter and also drawn off at least one point. There can also advantageously be multiple injection and draw-off points. It is possible, for example, to place an injection and a draw-off at each coil. FIG. 1 shows an intermediate example with four introduction hoses and four draw-off hoses.

Figure 2:
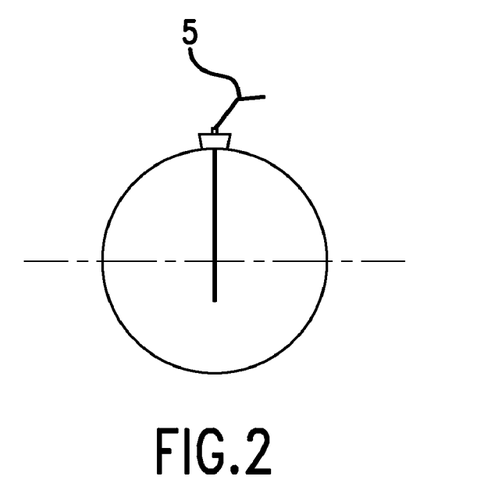
FIGS. 2 and 3 detail a tube that is a vibratory helical coil of the invention.
Figure 3:
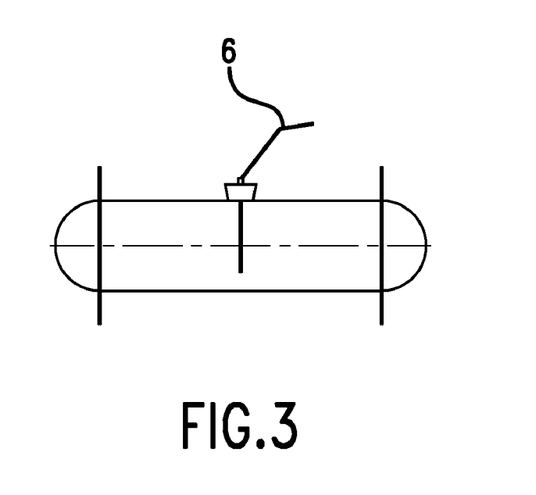

This arrangement makes possible the strict monitoring of the temperature, which is a condition that is important to the success of the productions. By way of illustration, FIG. 1 shows that 9 thermocouples are installed, and FIGS. 2 and 3 show the position of these thermocouples on the coils. The number of thermocouples is not limiting. FIG. 2 is a section of a tubular helical coil with thermocouple, and FIG. 3 is a section of a helical coil with a flattened trough with thermocouple.

The temperature is generally between 20 and 1000° C., advantageously between 20 and 500° C., preferably between 20 and 250° C., and the temperature conditions of the processes of sulfurization of the prior art can be applied.

According to the invention, the particles are subjected on their path to a temperature profile by passing through zones at different temperatures, preferably increasing or decreasing in the direction of movement of the particles. The example illustrates this embodiment that is authorized by the process with the vibratory helical coil, in particular heated by Joule effect.

It is also advantageous to arrange a final cooling zone (in the direction of the flow of particles).

The rate of advance of the particles is between 0.05 and 0.5 m/s, preferably 0.1-0.4 m/s, or else 0.1-0.3 m/s. The mass flow rate of particles per hour is in general between 1 kg/h and 50 t/h, preferably 5 kg/h to 10 t/h, and more preferably between 10-1000 kg/h.

The sulfur-containing compound is $H_2S$, which can be pure or diluted by $H_2$ or $N_2$.

The process applies particularly well to the sulfurization of the catalysts or adsorbents that contain Co, Mo, Ni and/or W, as well as to the catalysts or adsorbents that contain Cu, Ag or Au.

In the case now of a downward movement, the principle is essentially the same as for an upward movement. In the process according to the invention, the transit of the catalyst particles in the vibratory helical transporter can be performed in an upward or downward mode. Thus, the process is implemented by means of a vibration-driven helical transporter whose outcome of the forces applied to the catalyst particles is calculated so as to allow these catalyst particles either to rise or to fall.

The treatment of said catalyst or adsorbent can be carried out continuously or intermittently.

It is possible to complete this description by the operating conditions that are described below, whereby these indications are provided by way of nonlimiting examples.

The helical transporter—or optionally the transporters, if there are several of them, in series or in parallel—comprises at least one coil and is wound around a hollow drum in which is placed a system that is designed to produce the vibrations that are necessary for the falling or the rising of the catalyst particles. The acceleration imparted to the particles in motion in the coils comprises a vertical component and a horizontal component. According to the orientation of the horizontal component, the particles will rise or fall; the displacement speed of the particles is correlated with the horizontal component of the vibration.

The helical transporter can be characterized by the heating of certain turns of the coil by Joule effect at a temperature that is, for example, between 20 and 1000° C. (the temperatures that are used will actually depend on the conditions that are necessary to the sulfurization/presulfurization reaction). For a direct result, the Joule effect has the generation of heat in the mass of the coil. It thus makes it possible to obtain a greater flexibility for the control of the temperature within the coil relative to the indirect heating by coolant or to the direct heating by a gas, reactive or not, circulating in the coil.

In contrast, in some cases of the sulfurization process according to the invention, it may be advantageous to retain a low temperature. However, taking into account the high exothermicity of the sulfurization reactions in general, it may prove difficult to retain low temperatures in adiabatic reactors or in reactors that are less well insulated from outside exchanges. The helical transporter can, in this particular case, be an advantage considering its large outside metal surface area relative to its volume that imparts to it high heat exchange properties.

This is particularly true if the tube has a flattened shape, or a closed-trough shape, such as two plates, one on top of the other, whereby the flat lower shape is favorable to a large contact surface area between particles and wall, and therefore to a good heat exchange.

In the case of a heated helical transporter, a particular implementation of the process according to the invention can comprise a cooling of the solid particles at the end of the path, i.e., in the upper or lower end of the coil (according to whether it is an upward or downward movement). This cooling is carried out by bringing said end into indirect contact with a coolant. Said fluid may be water. Bringing into contact solid particles with at least one fluid over at least a portion of the path of said particles can be done successively several times along the path of said particles, independently or not of the heating of at least one turn of the coil by Joule effect. Said fluid circulates concurrent with or in counter-current to the circulation of the solid particles.

The process according to a particular implementation of the invention comprises the use of at least one vibratory helical coil that consists of a tube that is essentially circular in shape. FIGS. 2 and 3 illustrate this type of tube, shown in section, by indicating in addition the possible position of the thermocouple. Said coil, for example made of metal, comprises at least two turns and can be obtained by, for example, the shaping of a metallic tube along a helix around an essentially vertical axis. A central drum makes it possible to rigidify and to support the helix that is formed by the coil.

In the case of a vibratory helical transporter that is equipped with a heating by Joule effect, the coil is isolated electrically from the central drum by the attachment system. A transformer supplies the coil with low-voltage current, making it possible to heat directly by Joule effect the metallic mass of the tube to a temperature of, for example, between 20 and 1000° C. (as already indicated, the temperatures and other operating conditions are determined by the operating conditions of the sulfurization/presulfurization reaction). The implementation of such a heating system in general requires numerous electric tapping points along the coil. The voltage is adequate for allowing the desired and in general low power, for example less than 50 V, to be released for safety reasons.

The process according to a particular implementation of the invention comprises the use of at least one vibratory helical coil that consists of a tube that is flattened in shape, or a closed trough, as shown in FIG. 3.

The process according to a particular implementation of the invention comprises a helical transporter that is equipped with a system that comprises the circulation of a coolant. All of the coils, or simply a portion of the latter, may be in contact with a coolant. This fluid may be designed to cool the solid catalyst or adsorbent particles, so as to monitor the temperature in the case of an exothermic reaction subjected to maximum temperature constraints to obtain the product quality that is desired. This fluid may be water or an aqueous solution that makes it possible to reach temperatures that are lower than 0° C., or any other conventionally used coolant. This fluid can also be designed to heat the solid catalyst or adsorbent particles, so as to carry out the reaction at specific temperature conditions to obtain the product quality that is desired. In some cases, this system may be preferred to electric heating. The coolant may be vapor or any other conventionally used heating fluid.

The vibrations can be produced by at least one system that is placed at any adequate level, for example at the bottom or the top of the drum, or else positioned around the coil. Among the systems that may be used are found the following systems: unbalanced motors, electromagnetic vibrations (excited by a variable cycle, with creation of pulses), and unbalanced excitations. Preferably, the vibrations are produced by a table that is used as a support to the central drum, whereby said table is actuated by two unbalanced motors.

Always by way of example, the solid particles that are transformed by the process according to the invention have a grain size of between 10 μm (micrometer) and 10 mm (millimeter), and even between 100 μm and 5 mm.

Said solid catalyst or adsorbent particles are preferably balls, extrudates or pellets.

The device according to the invention may comprise:
(a) A tube with at least one coil that comprises at least two turns that are wound helically around a vertical axis and a central drum. The tube may be made of metal, preferably steel. Said coil has a developed length of between 1 and 200 m, and the height of the helix that is formed by said coil is generally between 0.1 and 20 m. The angle of rise of the coil that measures the tilt of the coil relative to the horizontal is between 1 and 10°, preferably between 1 and 5°, and even more preferably between 1 and 4°. The cross-section of the coil can be essentially circular, in which case the coil is a tube. Said tube generally has a diameter (or a diagonal) of between 10 and 300 mm, and even 500 mm. In the case of a device according to the invention for which the coil is a tube, the selection of the diameter of said tube is linked to various other parameters of the system including the mass flow rate per hour, the dwell time in the coil of solid particles and, in the case of the preferred vibration system according to the invention, the power of the unbalanced motors. The cross-section of the coil can be rather circular in shape as shown in FIG. 2, or rather flattened, as shown in FIG. 3.
(b) At least one lateral hose for introducing solid particles that opens on the lower end of the coil in the case of an upward movement or on the upper end of the coil in the case of a downward movement, and
(c) At least one lateral hose for drawing off said particles that opens on the upper end of the coil in the case of an upward movement or on the lower end of the coil in the case of a downward movement,
(d) At least one lateral hose for introducing at least one reactive fluid and a lateral hose for drawing off fluid reaction products, such that said fluid circulates in at least one turn of the coil. The number of hoses of this type is preferably 2 to 10, and even more preferably 3 to 5. The fluid circulates in co-current or in counter-current relative to the direction of circulation of the solid particles. The fluid flow rate (fluid that is introduced or released) is selected based on the type of solid particle conveyed. It is necessary to take this flow into account because it accelerates or brakes the particles according to its direction of circulation primarily for small particles. In particular, a fluid flow that circulates in counter-current runs the risk of blocking the device. For example, for sand particles with a grain size that is equal to 1.6 mm, the gaseous reactive flow rate circulating in counter-current is to be less than 2 m/s to allow the device to operate properly.
(e) Means for imparting vibrations to the drum-coil unit, such that: the non-dimensional acceleration constant, ratio of the vertical component of the acceleration to the acceleration of the gravity, is between in particular 0 and 4, preferably between 1.2 and 3.5, and even more preferably between 1 and 3, such that the rate of advance of the particles is between, by way of example, 0.05 and 0.5 m/s, preferably between 0.1 and 0.4 m/s, and even more preferably between 0.1 and 0.3 m/s, and such that the mass flow rate of particles per hour is between, for example, 1 kg/h and 50 tons/h, preferably between 5 kg/h and 10 tons/h.

In the case of the preferred implementation according to the invention, the vibrations are produced by a table that is used as a support to the central drum and is actuated by two unbalanced motors. In this case, the solid particles that are conveyed inside the coil advance at a speed that is proportional to the non-dimensional acceleration constant for a given motor incline and angle of rise. The non-dimensional acceleration constant depends on the spacing of imbalances and their speed of rotation for the given system. For a variation of said constant of between 1 and 3.5, preferably between 1.2 and 3.5, or else between 1 and 3, the rate of advance of the particles is typically between 0.1 and 0.3 m/s. Thus, said rate is easily adjustable by acting on the spacing of imbalances, the tilt of the motors, or the speed of rotation of the motors. As for the volumetric flow rate of the particles per hour, it depends on the non-dimensional vibration constant, but also on the diameter of the tube that forms the coil.

Preferably, in the case of an upward motion, the lateral hose for introducing said solid particles opens on the lower end of the coil, and the lateral hose for drawing off said particles opens on the upper end of the coil, and in the case of a downward motion, the lateral hose for introducing said solid particles opens on the upper end of the coil, and the lateral hose for drawing off said particles opens on the lower end of the coil.

Advantages of the Technology of the Invention Relative to a Rotary Kiln

Better monitoring of temperature in the exothermic reactions, greater possibility of evacuating calories.

Very good gas-solid contact, making it possible to improve extra-granular and intra-granular diffusion.

Possibility of sulfurizing with reduced dwell time. Perfect monitoring of dwell time; good flow of the piston-type solid.

Better local monitoring (at all points, for any solid particle) of the ratio of gas flow rate/solid flow rate, and therefore more homogeneous, more specific, sulfurization.

Low attrition rate, creation of fine particles.

Possibility of sulfurizing in a piece of equipment reducing the amount of $H_2S$ in gas phase. This is important because the local legislation imposes a maximum amount of 10 to 50 kg of $H_2S$ that is present on the industrial site "at an instant t" before a specific request for authorization. The reaction volume (or dead volume) is considerably lower than in a rotary kiln.

Lower threat in the case of a facility rupture due to this low reaction volume.

No part in motion, just a vibration, hence no need of joints, hence more limited risks of leakage. Crucial for dangerous gases such as $H_2S$.

Reduced space requirement, low installation cost, light maintenance; according to the current so-called "process intensification" tendency.

Advantages of the Technology of the Invention Relative to the Fluidized Bed

Better monitoring of temperature in these exothermic reactions, greater ability to evacuate calories via the metal walls, and not only the gas phase.

Better local monitoring (at any point, for any particle) of the ratio of gas flow rate/solid flow rate, and therefore more homogenous, more specific sulfurization.

Better monitoring of the dwell time; flow of the piston-type solid.

The attrition (creation of fine particles) is often high in a fluidized bed because of the impacts of particles on one another and on the walls. It is low in a vibrating transporter.

The fluidized bed uses high flow rates of gas, in this case a dangerous mixture that contains $H_2S$. In a fluidized bed, the gases are both a reagent and a hydraulic carrier that makes it possible to put the particles in motion, hence a requirement for high linear speed and therefore high gaseous flow rates. In general, a gas circuit with recycling is necessary, which complicates the installation in the case of a dangerous gas.

The vibrating transporter uses amounts of gas that correspond approximately to the stoichiometry of the reaction. The gas flow rates are low, which offers an advantage in terms of costs and safety. The gaseous effluents can be treated directly leaving the facility (by incineration, for example).

Lower HSE danger in the case of a facility rupture due to the low volume of the facility and the low gas flow rates.

Reduced space requirement, low installation cost; according to the current so-called "process intensification" tendency.

EXAMPLES

1. Sulfurization of Catalyst Particles that Contain Cobalt and Molybdenum

A catalyst for hydrotreating petroleum fractions, consisting of 24% by weight of molybdenum oxide $MoO_3$ and 4.5% cobalt oxide CoO that are supported on an alumina, is presulfurized under the following conditions using a mixture of hydrogen sulfide and hydrogen.

The reactor is a vibrating and heated helical transporter with the following characteristics: a tube with a diameter of 114 mm that is wound into 27 coils, with a total length of 127 m. The catalyst flow rate is adjusted to 80 kg/h. Under these conditions, the mean dwell time in the vibrating tube is 35 minutes. The flow rate of gas $H_2S$ is 20 m3/h, and that of $H_2$ is 80 m3/h. This mixture is injected into 3 zones that are also distributed along the tube. Four independent zones for electrical heating make it possible to obtain an upward temperature profile, whose mean values are: 81, 225, 340, 278° C.

The sulfur content of the final product is 11.6%, which corresponds to a sulfurization level of 94% relative to the theoretical stoichiometry of cobalt sulfide $Co_9S_8$ and molybdenum sulfide $MoS_2$, thus showing that the catalyst is well sulfurized, despite a relatively short dwell time.

2. Sulfurization of Particles that Contain Copper

A product that contains copper oxide (CuO content: 13.9% by weight) that is supported on an alumina is subjected to a sulfurization treatment. The desired reaction is as follows: $CuO+H_2S \Leftrightarrow CuS+H_2O$.

It can be carried out under an $H_2S/N_2$ mixture. It is very exothermic and is carried out in the same vibrating helical transporter of Example 1 if it is only the piece of equipment that is not heated for this test.

The product flow rate is adjusted to 140 kg/h. Under these conditions, the mean dwell time in the vibrating tube is 27 minutes. The hydrogen sulfide $H_2S$ gas flow rate is 7.2 m3/h, and that of nitrogen is 18 m3/h. This mixture is injected into 3 zones that are also distributed along the tube. The mean temperature profile is as follows: 85, 138, 154, 159° C.

The final product has a very homogeneous black color. Its sulfur content is 6.0% by weight or 105% of the theoretical stoichiometry that corresponds to CuS, which is very satisfactory. Despite a relatively high product flow rate, the product is, on the one hand, well sulfurized, and, on the other hand, its temperature has remained limited enough, which was sought to allow good quality.

3. Sulfurization of Catalyst Particles that Contain Cobalt and Molybdenum in an Unheated Coil A catalyst for hydrotreatment of petroleum fractions, consisting of 24% by weight of molybdenum oxide $MoO_3$ and 4.5% cobalt oxide CoO supported on an alumina, with fire loss measured at 500° C. of 18.5% by weight, is presulfurized under the following conditions using a mixture of hydrogen sulfide and hydrogen.

The reactor is a vibrating and unheated helical transporter with the following characteristics: a tube with a diameter of 114 mm that is wound in 27 coils, with a total length of 127 m. The catalyst flow rate is adjusted to 250 kg/h. Under these conditions, the mean dwell time in the vibrating tube is 35 minutes. The gas flow rate $H_2S$ is 41 m3/h, and that of $H_2$ is 21.6 m3/h. This mixture is injected into 3 zones that are also distributed along the tube. The mean temperature in the hottest zones is 225° C. This temperature is reached owing to the exothermy of the reaction and the relatively high flow rate of catalyst and reactive gas.

The sulfur content of the final product is 9.7%, which corresponds to a sulfurization rate of 79% relative to the theoretical stoichiometry of cobalt sulfide $Co_9S_8$ and molybdenum sulfide $MoS_2$, thus showing that the catalyst is correctly sulfurized, despite a relatively short dwell time.

It is probable that the formation of the active radicals is not complete at this temperature level, knowing that it is often admitted that at least 300° C. is necessary to form them. Nevertheless, the process retains its full advantage, namely the one of using a ready-for-use catalyst. Its amount of sulfur that corresponds to 79% of the theoretical level of the sulfide phase makes it possible, in the majority of applications of the hydrotreatment, to start it up under a liquid feedstock and hydrogen, and the active phase will end by itself in the first hours of its use.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding French application 07/03.360, filed May 10, 2007, are incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. An off-site sulfurization process comprising:
   incorporating sulfur in the porosity of solid particles of a catalyst or an adsorbent containing at least one of the metals cobalt, molybdenum, nickel, tungsten or copper, silver or gold,
   wherein said process is carried out in the presence of a reaction gas comprising a hydrogen sulfide gas diluted or not in hydrogen or nitrogen,
   wherein said solid particles are made to rise or fall in a sulfurization zone in a vertically disposed vibrating helical coil, said coil having a bottom end and a top end and a multiplicity of longitudinally spaced apart lateral orifices,
   said sulfurization being conducted solely by gas-solid contact comprising passing said solid particles of catalyst or adsorbent into the top or bottom end of the vibrating coil and passing said reaction gas into said multiplicity of spaced apart lateral orifices,
   wherein the temperature at the coil and flowrate of the reaction gas through said lateral orifices and said vertically disposed vibrating helical coil is continually monitored and the flowrate of said reaction gas and catalyst or absorbents is continually adjusted as needed to establish a temperature profile between 20° C. and 250° C. that is solely controlled by the exothermal heat generated from a reaction between said reaction gas and said catalyst or adsorbents, and wherein the temperature is lower than that required to provide stoichiometric sulfided particles and wherein no turns of the coil are heated by Joule effect.

2. A process according to claim 1, in which, at the end of the process, the solid particles are cooled by a coolant.

3. A process according to claim 1, in which the particles are subjected to an increasing or decreasing temperature profile in the directions of movement of the particles.

4. A process according to claim 1, conducted at a temperature between 20 and 225° C.

5. A process according to claim 1 wherein said catalyst or adsorbent contains at least copper, silver or gold.

6. A process according to claim 1, in which said sulfur incorporation zone comprises a down-coil unit comprising:
   a tube with at least one coil comprising at least two turns wound helically around a vertical axis and a central drum, said coil having a length less than 200 m and a helix height formed by said coil being generally less than 20 m, an angle of rise of the coil that measures the tilt of the coil relative to the horizontal being between 1 and 10°, the cross-section of the coil being essentially circular, the coil being essentially in the form of a tube having a diameter between 10 and 300 mm; said process comprising
   introducing said solid particles into the lower part of the coil for upward movement or on the upper part of the coil for downward movement, and
   withdrawing resultant solid sulfurized particles of catalyst or adsorbent from the upper part of the coil in the case of an upward movement or on the lower part of the coil in the case of a downward movement,
   introducing said hydrogen sulfide gas and hydrogen into at least one turn of the coil, so as to circulate the gases co-currently or counter-currently to the direction of circulation of the solid particles, and
   imparting vibrations to the drum-coil unit, so as to provide a ratio of the vertical component of the acceleration to the acceleration of the gravity, of between 1.2 and 3.5, such that the rate of advance of the particles is between 0.1 and 0.3 m/s, and advancing the mass at a flow rate of solid particles per hour of between 1 kg/h and 50 tons/h.

7. A process according to claim 6, the drum-coil unit comprises a vibratory table actuated by two unbalanced motors.

8. A process according to claim 6, in which the coil is metal and essentially tubular in shape.

9. A process according to claim 6, in which the coil is metal and flattened in shape.

10. A process according to claim 6, wherein said angle of the rise of the coil is between 1° and 15°.

11. A process according to claim 1, comprising incorporating sulfur in cobalt, molybdenum, nickel or tungsten.

12. A process according to claim 1, comprising passing a mixture of said solid particles and said gas phase into a plurality of zones distributed along the coil.

13. A process according to claim 11, comprising passing a mixture of said solid particles and said gas phase into a plurality of zones distributed along the coil.

14. A process according to claim 11, wherein the hydrogen sulfide is diluted with hydrogen.

15. A process according to claim 13, wherein the hydrogen sulfide is diluted with hydrogen.

16. A process according to claim 1, wherein the solid particles comprise copper.

17. A process according to claim 1, wherein the number of orifices is 2 to 10.

18. A process according to claim 1, wherein the number of orifices is 3 to 5.

* * * * *

UNITED STATES PATENT AND TRADEMARK OFFICE
CERTIFICATE OF CORRECTION

| | | |
|---|---|---|
| PATENT NO. | : 8,088,705 B2 | Page 1 of 1 |
| APPLICATION NO. | : 12/117805 | |
| DATED | : January 3, 2012 | |
| INVENTOR(S) | : Pierre Dufresne et al. | |

It is certified that error appears in the above-identified patent and that said Letters Patent is hereby corrected as shown below:

Title Page, Item (73) Assignee: reads – IFP ENERGIES NOUVELLES - should read
    --EURECAT S.A.--

Signed and Sealed this
Ninth Day of April, 2013

Teresa Stanek Rea
*Acting Director of the United States Patent and Trademark Office*